Jan. 3, 1961 L. F. SCHAEFER ET AL 2,967,237

SYNCHRONOUS DETECTOR

Filed March 26, 1958

INVENTORS
LOUIS F. SCHAEFER &
BY ALBERT MACOVSKI
W. H. Sponagle
ATTORNEY 2,967,237
Patented Jan. 3, 1961

2,967,237

SYNCHRONOUS DETECTOR

Lou's F. Schaefer, Kew Gardens, and Albert Macovski, Massapequa, N.Y., assignors to Radio Corporation of America, a corporation of Delaware Filed Mar. 26, 1958, Ser. No. 724,196

3 Claims. (Cl. 250—20)

This invention relates to synchronous detector circuits for deriving the amplitude modulation information on a carrier wave. While not limited thereto, the invention is particularly useful as a second detector for demodulating the intermediate-frequency vestigial sideband signal in a television receiver.

Synchronous detection is accomplished by adding or multiplying the signal to be detected with a demodulating oscillation having the same frequency and phase as the carrier of the signal to be detected. The demodulating oscillation in an adding arrangement should have an amplitude which is constant and which is several times as great as the amplitude of the carrier component of the signal to be detected. Synchronous detection of vestigial sideband and double sideband signals has not enjoyed widespread commercial use because of the difficulty of generating the necessary synchronous demodulating oscillations. Synchronous detection is superior to ordinary diode envelope detection in that it provides less distortion, better selectivity and better noise immunity.

It is a general object of this invention to provide a simple improved synchronous detector circuit for demodulating received signals which include a carrier frequency component.

It is another object to provide an improved synchronous detector characterized in having a high degree of wide band envelope rejection, high conversion gain and low output impedance.

According to the invention, two amplifier devices are connected in series, or in cascode, between a source of unidirectional potential and a point of reference potential. The wide band input signal to be demodulated is applied across the input electrodes of both amplifier devices in the same polarity. A narrow band circuit tuned to the frequency of the carrier of the input signal is coupled to output electrodes of the amplifier devices. The amplified narrow band carrier-frequency demodulating oscillations obtained from the narrow band circuit are coupled back to input electrodes of both amplifier devices in opposite polarities. A synchronously detected output signal is obtained from a junction point between the two series-connected amplifier devices.

These and other objects and aspects of the invention will be apparent to those skilled in the art from the following more detailed description taken in conjunction with the appended drawings, wherein.

Figure 1:
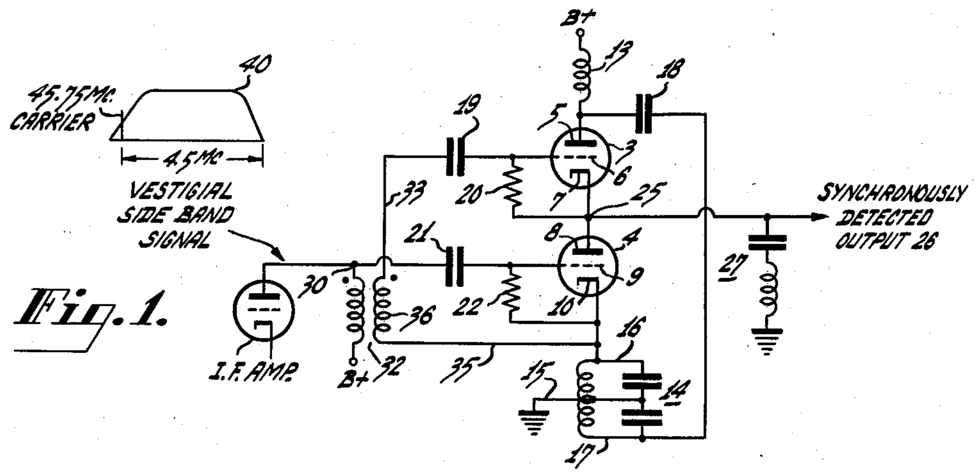
Figure 1 is a circuit diagram of a preferred form of the invention.

Figure 1 shows a circuit diagram of one form of the invention. Two amplifier devices 3 and 4 are connected in series between a B+ terminal of a source of unidirectional potential and a point of reference potential such as ground. Amplifier device or vacuum tube 3 has an anode 5, a grid 6 and a cathode 7; amplifier device or vacuum tube 4 has an anode 8, a grid 9 and a cathode 10. An inductance 13 is connected between the anode of amplifier device 10 and the B+ terminal and is proportioned to constitute a load impedance at the frequency of the input signal to be detected. The cathode 7 of tube 3 is connected to the anode 8 of tube 4. A tuned circuit 14 is provided with a grounded center tap and is tuned to the frequency of the carrier of the input signal to be detected. One extremity 16 of the tuned circuit 14 is connected to the cathode 10 of the amplifier device 11, and the other extremity 17 of the tuned circuit 14 is coupled through a coupling capacitor 18 to the anode 5 of the amplifier device 3. Capacitor 19 and resistor 20 are connected to provide self-bias circuit for the input electrodes 6 and 7 of the amplifier device 3. Capacitor 21 and resistor 22 are connected to provide a self-bias circuit for the input electrodes 9 and 10 of the amplifier device 4. A synchronously detected output signal is obtained from the junction point 25 between the cathode 7 of tube 3 and the anode 8 of tube 4. The input signal frequency components are eliminated from the junction point 25 and the output 26 by means of a series resonant trap 27 which presents a very low impedance to these frequencies and by-passes them to ground.

A vestigial sideband signal, such as the intermediate frequency signal in a television receiver, is coupled to input terminal 30 from which it is coupled through capacitor 21 to the grid 9 of tube 4. The input signal is also coupled from input terminal 30 through the transformer 32, lead 33 and capacitor 19 to the grid 6 of tube 3. The transformer 32 is poled so that input signals are applied to the grids of both tubes in the same phase or polarity.

The input signal is amplified in both of the tubes 3 and 4. An amplified signal from the plate 5 of tube 3 is coupled through capacitor 18 through the lower end 17 of the center tapped tuned circuit 14. An amplified signal from the cathode 10 of tube 4 is applied to the upper end 16 of the center tapped tuned circuit 14. The tuned circuit 14 is tuned to the frequency of the carrier of the incoming signal to be demodulated and is constructed to have a narrow frequency response characteristic. The amplified carrier frequency signal developed at the upper end 16 of tuned circuit 14 is applied directly to the cathode 10 of tube 4 and is applied over lead 35, the secondary coil 36 of transformer 32, the lead 33 and the coupling capacitor 19 to the grid 6 of tube 3. Since the signal from the tuned circuit 14 is applied to the cathode of tube 4, and is applied to the grid of tube 3, the signal is effectively applied to input electrodes of the two tubes with opposite polarities.

The tubes 3 and 4 are connected to operate as a difference amplifier for the detected signals, that is, the output at the intermediate point 25 varies according to the difference between the envelopes of the signals applied to the input electrodes of tube 3 and the signals applied to the input electrodes of tube 4. This is due to the fact that the same current is constrained to flow in both tubes. Both tubes are continuously conductive. The signals applied to the two tubes vary the impedances of the tubes in such a way that the voltage at point 25 reflects the difference between the signals applied to the two tubes.

Figure 2A:
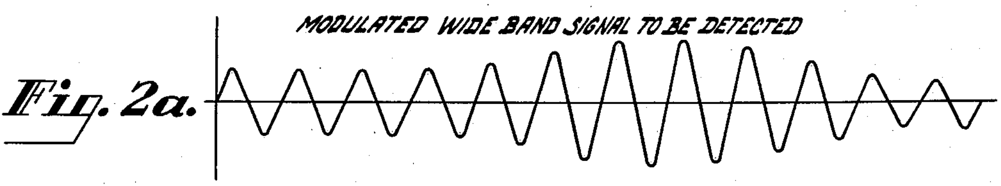
Figures 2A, 2B and 2C are waveform charts which will be referred to in explaining the operation of the invention.
Figure 2B:
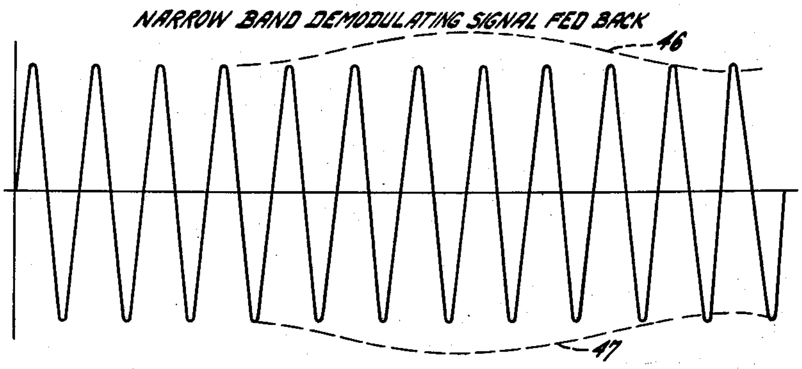
Figure 2C:
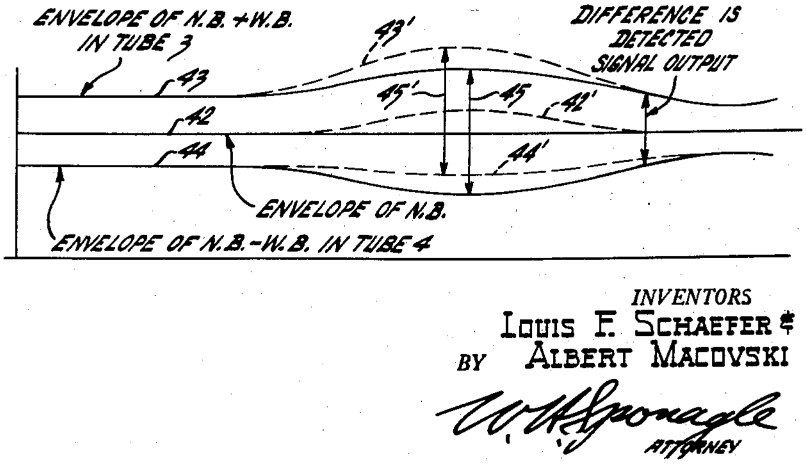

The wide band vestigial sideband signal applied to input terminal 30 may be a television intermediate frequency signal having a carrier frequency of 45.75 megacycles and a bandwidth of about 5 megacycles as illustrated by the amplitude vs. frequency characteristic 40 in Figure 1. The amplitude vs. time characteristic of the wide band signal may be as illustrated in the chart of Figure 2A. The amplified signal coupled from the anode of tube 3 to the bottom 17 of circuit 14 is of reversed polarity, compared with the input signal, and the amplified signal connected from the cathode of tube 4 to the top 16 of circuit 14 is of the same polarity. Circuit 14 is tuned to develop frequency components in a range of about 0.5 megacycle centered about the carrier frequency of 45.75 megacycles. It is assumed, for the moment, that this narrow band signal is of constant amplitude as illustrated in Figure 2B. This narrow band signal derived from output electrodes of both tubes is coupled from the top 16 of circuit 14 to the cathode 10 of tube 4 and the grid 6 of tube 3. The amplified narrow band signal, is thus applied to the tube 3 in the same polarity as the input wide band signal, and is applied to the tube 4 in a polarity opposite to that of the wide band signal applied thereto. The narrow band signal, if alone, would be rectified by the cathode-grid diodes of each tube to provide an envelope 42 in Figure 2C. The sum of the same-polarity narrow band and wide band signals is rectified by the cathode-grid diode of tube 3 to provide the N.B. plus W.B. envelope 43 in Figure 2C. The sum of the opposite polarity narrow band and wide band signals is rectified by the cathode-grid diode of tube 4 to provide the N.B. minus W.B. envelope 44 in Figure 2C. The detected signal appearing at the output 26 is the difference between envelopes 43 and 44 as represented by the dimension 45 in Figure 2C.

As has been stated, it is important in achieving the advantages of synchronous detection that the narrow band signal (the demodulating oscillation) be of constant amplitude. Limiters have been employed for this purpose. According to the present invention, a limiter is not required, but the circuit is constructed to ignore amplitude variations in the narrow band demodulating signal. The amplified narrow band signal of Figure 2B does have the amplitude variations of the wide band signal of Figure 2A, although to a lesser extent because of the restricted frequency range. The cycles of the narrow band signal may, for example, have amplitudes extending to the dashed lines 46, 47 in Figure 2B. Then the envelope of the sum of the narrow band and wide band signals in tube 3 will follow dashed curve 43′, and the envelope of the difference between the narrow band and wide band signals in tube 4 will follow the dashed curve 44′. It will be seen that the resulting detected output signal 45′ is the same as the output signal 45 obtained by assuming a prefectly constant-amplitude narrow band signal.

The narrow band circuit 14 may be tuned to a harmonic of the received carrier frequency, rather than to the fundamental of the carrier frequency. When the narrow band signal is a harmonic, such as the second or third harmonic, the possibility of stray coupling between the narrow band and wide band circuits is eliminated. The mode of operation of the demodulator system remains substantially the same as has been described.

It is therefore apparent that, according to this invention, a synchronous detection system is provided wherein the carrier frequency component of the signal to be detected is amplified in the same devices wherein detection is performed, whereby to provide synchronous demodulating oscillations, and that the amplified narrow band carrier frequency components are reapplied to the detector in such a way as to eliminate the effects, in the output, of variations in the amplitude of the amplified carrier frequency components.

What is claimed is:

1. A synchronous detector comprising, a source of bias potential relative to a point of reference potential, first and second amplifier devices connected in series between said source of bias potential and said point of reference potential, said amplifier devices each including input and output electrodes, a source of amplitude modulated carrier wave signals to be demodulated, means coupling said source of signals to input electrodes of both of said devices in the same polarity, a narrow band circuit tuned to a frequency bearing an integral relation to that of said carrier wave and coupled to output electrodes of both of said devices, means coupling the output of said narrow band circuit to input electrodes of both of said devices in opposite polarities, and means to derive a synchronously detected signal from a junction between said two series-connected amplifier devices.

2. A synchronous detector comprising, a source of bias potential relative to a point of reference potential, first and second amplifier devices connected in series between said source of bias potential and said point of reference potential, said amplifier devices each including input and output electrodes, a first circuit providing source of signals including an amplitude modulated carrier frequency component to be demodulated, a second circuit tuned to said carrier frequency and coupled to output electrodes of said amplifier devices, means coupling one of said circuits to the input electrodes of both of said devices in the same polarity, means coupling the other of said circuits to the input electrodes of both of said devices in opposite polarities, and means to derive a synchronously detected signal from a junction between said two series-connected amplifier devices.

3. In a television receiver, the combination of, a source of bias potential relative to a point of reference potential, first and second amplifier devices connected in series between said source of bias potential and said point of reference potential, said amplifier devices each including input and output electrodes, a source of a vestigial sideband intermediate frequency amplitude modulated carrier wave signal to be demodulated, means coupling said source of intermediate frequency signal to input electrodes of both of said devices in the same polarity, a narrow band circuit tuned to the frequency of the carrier wave of the intermediate frequency signal and coupled to output electrodes of both of said devices, means coupling the output of said circuit to input electrodes of both of said devices in opposite polarities, and means to derive a synchronously detected signal from a junction between said two series-connected amplifier devices.

References Cited in the file of this patent

UNITED STATES PATENTS

| | | |
|---|---|---|
| 2,413,977 | Koch | Jan. 7, 1947 |
| 2,634,369 | Swanson et al. | Apr. 7, 1953 |
| 2,846,578 | Tarantur | Aug. 5, 1958 |